(12) United States Patent
Tamm et al.

(10) Patent No.: US 9,110,217 B2
(45) Date of Patent: Aug. 18, 2015

(54) ELECTRONIC DEVICE WITH HIDDEN GAP BETWEEN FRAME AND LENS

(71) Applicant: BlackBerry Limited, Waterloo (CA)

(72) Inventors: Carsten Tamm, Arnsberg (DE); Georg Robert Gustav Steiner, Erkrath (DE)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/041,578

(22) Filed: Sep. 30, 2013

(65) Prior Publication Data

US 2015/0002945 A1    Jan. 1, 2015

Related U.S. Application Data

(60) Provisional application No. 61/840,707, filed on Jun. 28, 2013.

(51) Int. Cl.
  *G02B 7/02*  (2006.01)
  *G02B 7/00*  (2006.01)
  *G06F 1/16*  (2006.01)
  *H04M 1/02*  (2006.01)

(52) U.S. Cl.
  CPC .. *G02B 7/02* (2013.01); *G02B 7/00* (2013.01); *G06F 1/1637* (2013.01); *G06F 1/1643* (2013.01); *H04M 1/0266* (2013.01); *Y10T 29/49826* (2015.01)

(58) Field of Classification Search
  CPC ................................... G02B 7/00; G02B 7/02
  USPC .......................................... 359/808, 811, 819
  See application file for complete search history.

(56) References Cited

U.S. PATENT DOCUMENTS

| | | | |
|---|---|---|---|
| 2004/0051944 A1* | 3/2004 | Stark | ............................. 359/448 |
| 2009/0257189 A1 | 10/2009 | Wang et al. | |
| 2014/0160367 A1 | 6/2014 | Huang et al. | |

FOREIGN PATENT DOCUMENTS

| | | |
|---|---|---|
| EP | 2306437 A1 | 4/2011 |
| WO | 2014002859 A1 | 1/2014 |

OTHER PUBLICATIONS

European Extended Search Report; Application No. 14173267.7; Nov. 10, 2014; 9 pages.

* cited by examiner

*Primary Examiner* — William Choi
(74) *Attorney, Agent, or Firm* — Conley Rose, P.C.; J. Robert Brown, Jr.

(57) ABSTRACT

An electronic device is provided and includes a substrate assembly comprising a first area and a frame at a periphery of the first area and a lens, which is configured to be affixed to the first area, and which comprises a second area and a curved area at a periphery of the second area. The curved area is separated from the frame by a gap and is configured to reflect light across the gap to hide the gap from an observer looking into the gap.

22 Claims, 4 Drawing Sheets

ELECTRONIC DEVICE WITH HIDDEN GAP BETWEEN FRAME AND LENS

CROSS REFERENCE TO RELATED APPLICATION

This application is a Non-Provisional Application of U.S. Provisional Application No. 61/840,707, which was filed on Jun. 28, 2013. The entire contents of U.S. Provisional Application No. 61/840,707 are incorporated herein by reference.

BACKGROUND

Aspects of the invention are directed to electronic devices and, more particularly, to electronic devices with a hidden gap between a frame and a lens.

Numerous types of electronic devices are presently in use. Exemplary electronic devices include televisions, personal data assistants (PDAs), handheld computers, two-way pagers and cellular telephones. Many feature wireless communication capability and/or are stand-alone devices that are functional without communication with other devices. Electronic devices can be static or may be portable, with many being small enough to fit within a pocket, a belt holster, a briefcase or a purse. As the form factor of static or portable devices has shrunk recently, so have the sizes of various components of the electronic devices. For example, frames and lenses have steadily decreased in size for many years.

In general, the frame of an electronic device provides for structural support and impact protection. The lens covers the display and provides for optical effects and, in the case of touchscreens, permits operations of the capacitive sensor disposed below the lens. Due to assembly issues, such as machining tolerances, there is often a gap formed between the frame and the lens in particular electronic devices. This gap can reduce an aesthetic appeal of the electronic device and can form a rough edge that is unpleasant to touch.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
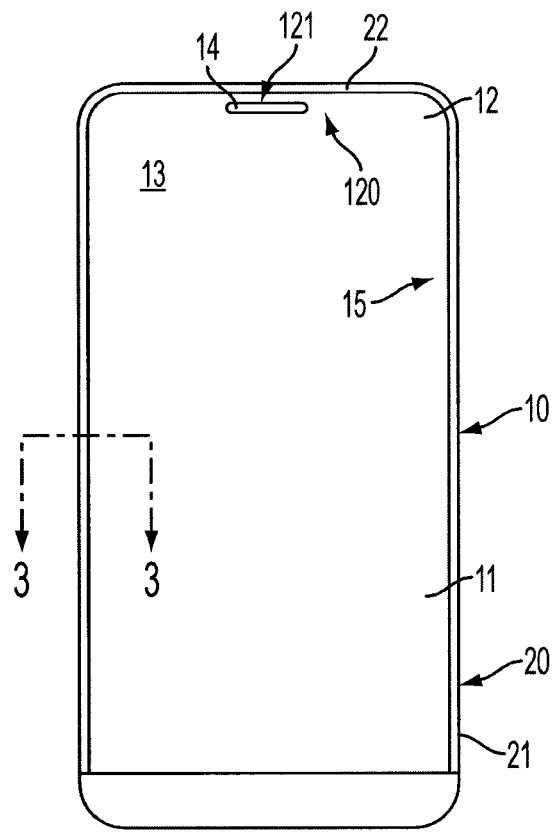
FIG. 1 is a plan view of an electronic device in accordance with embodiments.
Figure 2:
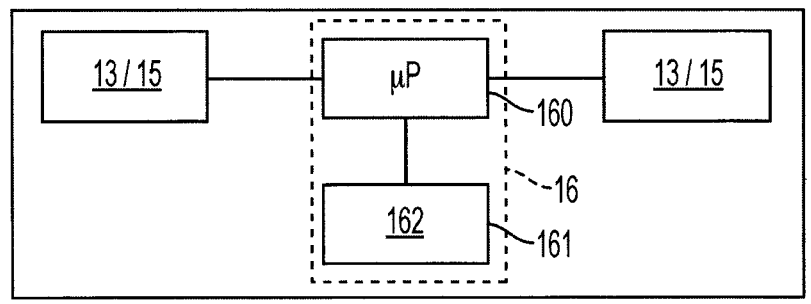
FIG. 2 is a schematic depiction of the electronic device of FIG. 1.

With reference to FIGS. 1 and 2, an electronic device 10 is provided. The electronic device 10 may be, for example, a handheld electronic device such as a smartphone. As shown in FIGS. 1 and 2, the electronic device 10 includes a housing 11, an interior structural member 12, a touchscreen display 13, an input/output element 14, a lens 15 and a processor 16. The housing 11 is substantially rectangular in shape, although this is not required and includes a frame 20 that is disposed at a periphery of the electronic device 10. The frame 20 is made of plastic and has rounded corners, substantially straight sidewalls 21 and substantially straight endwalls 22. The interior structural member 12 is housed and supported within the housing 11 and is formed to define a first aperture 120, by which the touchscreen display 13 is accessible to an operator or user, and a second aperture 121. The input/output element 14 is accessible through the second aperture 121 and may include a microphone or speaker. The lens 15 is made of glass or glass-like materials (e.g., polymers) and covers the interior structural member 12 and the touchscreen display 13. It will be appreciated that the device 10 can have buttons or a keyboard below the lens 15, e.g., the Q10 phone by Research In Motion or Waterloo, ON., Canada.

In accordance with embodiments, the lens 15 and the frame 20 may both have a similar color and glossiness. This adds to the effectiveness of the gap hiding features described below.

Where the electronic device 10 is a smartphone or a similar handheld, portable communication and computing device, the touchscreen display 13 may serve as an input apparatus and/or an output apparatus that is controllable by user inputs to the touchscreen display 13 and by the processor 16. The processor 16 is disposed in the housing 11 and includes processing circuitry 160 and a memory 161. The processing circuitry 160 may be, for example, a microprocessor (µP) that interfaces with the memory 161. The memory 161 can be any one or more of a variety of types of internal and/or external storage media, such as RAM, ROM, EPROM(s), EEPROM(s) and FLASH provide a storage register, i.e., a machine readable medium, for data storage. The memory 161 can be volatile memory or nonvolatile memory. The memory 161 has a number of routines 162 that are stored therein and which are executable on the processing circuitry 160.

The routines 162 may include, for example, a graphical user interface (GUI) application. When executed, the GUI causes the processing circuitry 160 to display on the touchscreen display 13 various GUI elements that are optically and/or tactilely interfaced with by the operator or user. That is, a user of the electronic device 10 may touch the touchscreen display 13 to activate a certain application, and the processing circuitry 160 responds by displaying the graphics of the application to the user in response via the touchscreen display 13.

Figure 3:
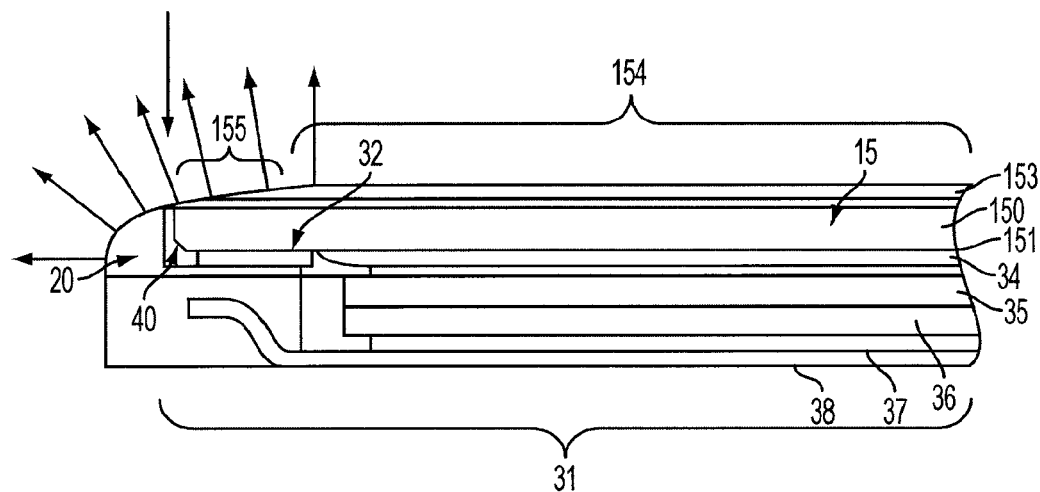
FIG. 3 is a cross-sectional view of an electronic device taken along line 3-3 of FIG. 1 in accordance with embodiments.
Figure 4:
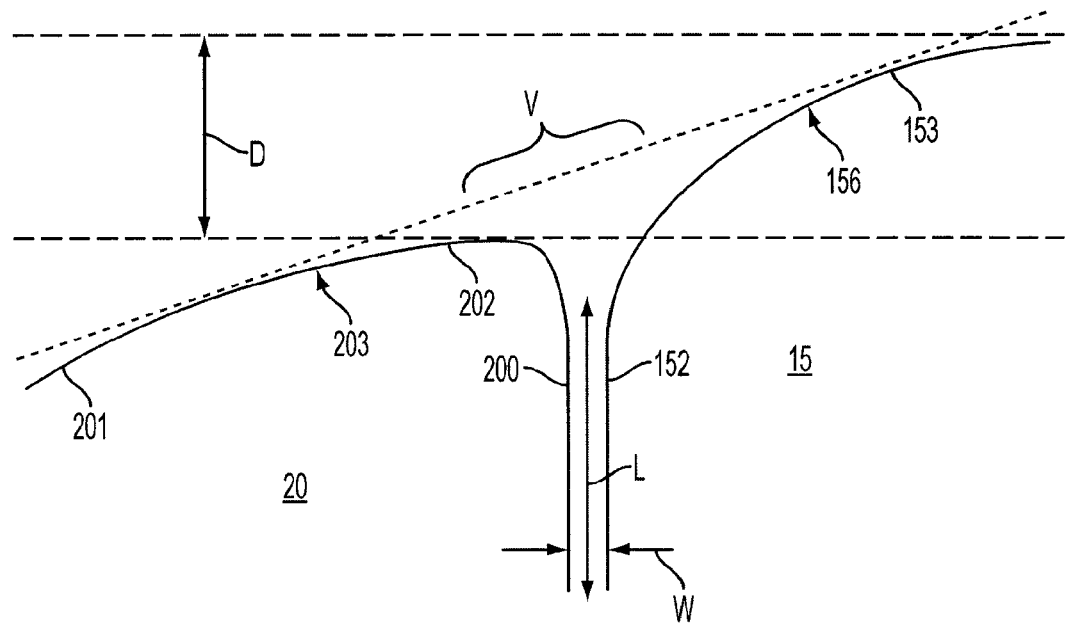
FIG. 4 is an enlarged view of a gap formed between a frame and a lens of the electronic device in accordance with embodiments.

In greater detail and, with reference to FIGS. 3 and 4, the electronic device 10 further includes a substrate assembly 30. The substrate assembly 30 includes a first area 31 and the frame 20, which may be disposed just outside of a periphery of the first area 31. In accordance with embodiments, the first area 31 may be defined as a central area of the electronic device 10 that extends outwardly and almost to the edge of the electronic device 10. The frame 20 includes an inwardly facing side 200 and an outwardly facing side 201, which may be curved. The lens 15 is configured to be affixed to the first area 31 and includes a lens body 150 having a first substantially planar side 151, an edge 152 and a second side 153. The second side 153 includes a second area 154 and a curved area 155. In accordance with embodiments, the second area 154 may be defined as a central area that extends outwardly and is substantially planar in a central region thereof. The second area 154 also protrudes beyond a distal edge 202 of the frame 20 by a distance D as measured from a plane of the substrate assembly 30 (see FIG. 4).

As shown in FIGS. 3 and 4, the curved area 155 is defined at a periphery of the second area 154 and leads to the edge 152. The edge 152 and the inwardly facing side 200 of the frame 20 define a longitudinal length L and a width W of a gap 40. The portion of the curved area 155 proximate to the gap 40 and the distal edge 202 of the frame 20 define a delta-type formation leading to the gap 40 and having a viewing window V. As will be discussed below, an observer looking into the gap 40 from the normal angle (see FIG. 3) may have his/her eye irritated by a glare off of the curved area 155 that prevents or hinders his ability to gage a depth of the gap 40 (i.e., the longitudinal length L of the gap 40). Meanwhile, an observer looking into the gap 40 from an angle with respect to the normal angle will only be able to see into the viewing window V and thus will be similarly prevented or hindered from gaging the depth of the gap 40 as he/she will only be able to see the portion of the curved area 155 proximate to the gap 40 and the edge 152.

With the curved area 155 and the edge 152 both separated from the inwardly facing side 201 of the frame 20 by at least the gap 40, at least the curved area 155 may be configured to reflect light incident on the lens 15 at the normal angle across the gap 40. This reflection effect serves to effectively hide the gap 40 from the observer looking into the gap at the normal angle and is provided by a curvature 156 of the curved area 155. In particular, the curvature 156 is configured to lead tangentially (see dashed line in FIG. 4) to a corresponding curvature 203 of the frame 20 across the gap 40. The curvature 156 is continuous and extends smoothly from a periphery of the second area 154 to the edge 152.

In accordance with embodiments, the substrate assembly 30 may include an adhesive 32 by which a portion of the first substantially planar side 151 of the lens body 150 proximate to the edge 152 is adhered or otherwise affixed to a shoulder portion 33 of the substrate assembly 30. Within the planar region bound by the adhesive, the substrate assembly 30 may further include an optical clear adhesive 34 adjacent to the central portion of the first substantially planar side 151, a capacitive sensor 35 adjacent to the optical clear adhesive 34, an organic light emitting diode (OLED) 36 adjacent to the capacitive sensor 35, a backside foam layer 37 adjacent to a backside of the OLED 36 and a sheet metal insert layer 38 adjacent to a backside of the foam layer 37.

With the configuration described above and, with reference to FIGS. 3 and 5, an effect of the lens 15 including the curved area 155 will now be described. As shown in FIG. 3, the light that is incident on the lens 15 at a normal angle with respect to the second area 154 will be reflected by the curved area 155 at a reflection angle defined transversely with respect to the normal angle. At an inward portion of the curved area 155 proximate to the second area 154, this reflection angle is relatively small. However, since the curvature 156 increases with increasing proximity to the gap 40, the reflection angle of incident light from outward portions of the cured area 155 proximate to the gap 40 is relatively large. As such, the reflected light crosses over the gap 40 from the perspective of the observer looking into the gap 40. This cross-over of the reflected light has the effect of irritating the eye of the observer by producing a glare 50 that obscures the gap 40.

Figure 5:
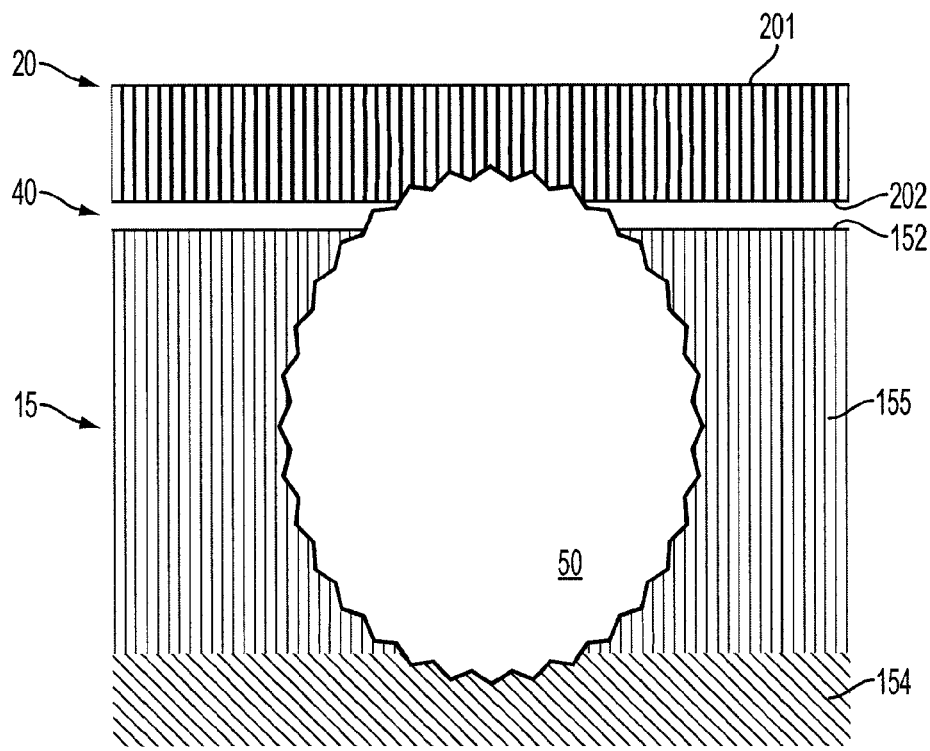
FIG. 5 is a diagram of reflected light across the gap of FIG. 4.

Since the curvature 156 is configured to lead tangentially to the corresponding curvature 203 of the frame 20 across the gap 40, the reflection effect continues over the gap 40 and into the frame 20. Thus, as shown in FIG. 5, the glare 50 may extend over the entire span of the curved area 155, appear to cross over the gap 40 and continue over the frame 20.

Figure 6:
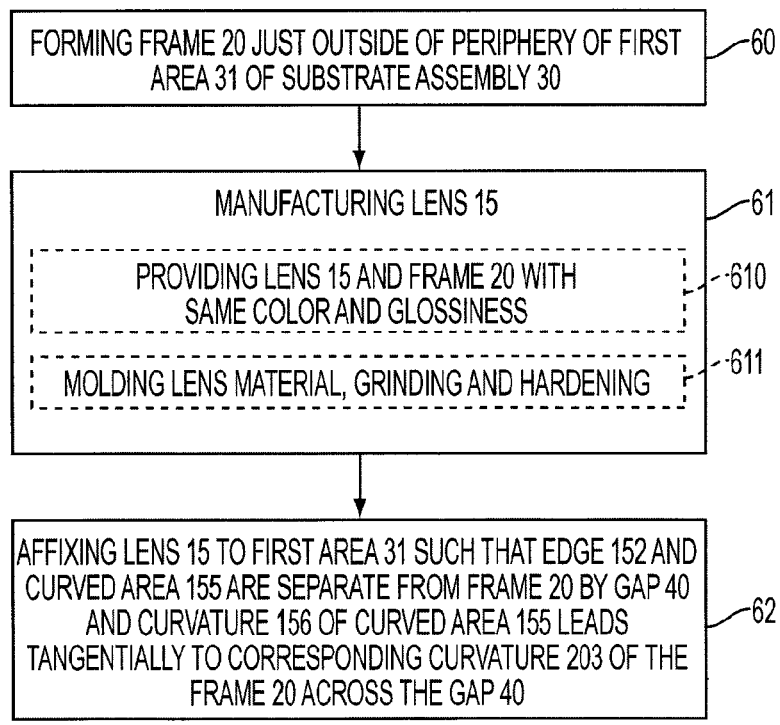
FIG. 6 is a flow diagram illustrating a method of assembling an electronic device in accordance with embodiments.

With reference to FIG. 6, a method of assembling the above-described electronic device 10 is provided. The method includes forming the frame 20 just outside of the periphery of the first area 31 of the substrate assembly 30 (operation 60), manufacturing the lens 15 with the second area 154 and the curved area 155 at a periphery of the second area 154 (operation 61) and affixing the lens 15 to the first area 31 such that the edge 152 and the curved area 155 are separate from the frame 20 by the gap 40 and the curvature 156 of the curved area 155 leads tangentially to the corresponding curvature 203 of the frame 20 across the gap 40 (operation 62). As shown in FIG. 6, the manufacturing of the lens 15 may include providing the lens 15 and the frame 20 with similar color and glossiness (operation 610) and molding a lens material (i.e., glass) into a general shape of the lens 15, grinding the lens material in the vicinity of the curved area 155 and hardening the lens material (operation 611) into the final glass form.

Figure 7:
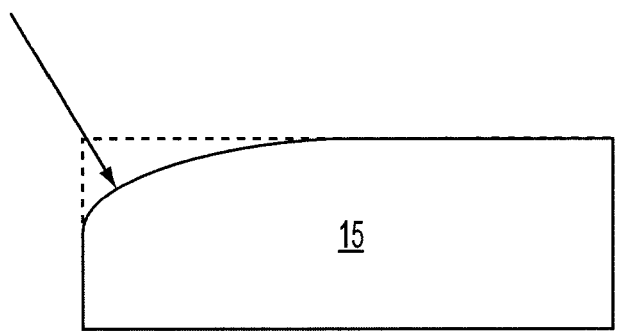
FIG. 7 is a schematic illustration of a strengthening of a lens of an electronic device with thinning due to a curvature at an edge of the lens in accordance with embodiments.

In accordance with aspects of the invention and, with reference to FIG. 7, it is to be understood that the lens 15 is thinned at the curved area 155 due to the curvature 156 but is stronger and more resistance to drop damage than a lens without a curvature. This increased strength is a result of decreased stress concentrations at the curved area 155 and the edge 152 due to the lack of angular edges in that region and a decreased number of flaws in the lens material (i.e., the glass) owing to the lack of angular edges. In particular, glass features tend to break along fractures that propagate from such flaws so that decreased numbers of the flaws corresponds to a decreased tendency for those glass features to break. With this increased strength, the distal edge 203 of the frame 20 can be lowered relative to the second area 154 of the lens 15 by the distance D, as shown in FIG. 4.

In most electronic devices, the distal edge of the frame will protrude outwardly from the plane of the lens by a small amount (i.e., about 0.15 millimeters) in order to protect the lens from, for example, drop impacts. Especially for touch-screen applications, this protrusion of the frame can lead to the device having an unpleasant tactile feel as a user's finger moves over it during, for example, a scrolling movement. In accordance with embodiments, however, the lowered distal edge 203 of the frame 20 (i.e., the protrusion of the lens 15 beyond an outermost plane of the frame 20) addresses that issue and forms a smooth periphery of the electronic device. Moreover, since the lens 15 includes the curved area 155, the strength of the lens 15 is increased and allows the lens 15 to absorb and withstand drop impacts without the protection afforded by the protruding frame. In addition, since the curved area 155 has a smooth continuous curved from the second area 154 to the edge 152, any impacts to the lens 15 will be effectively realized as flat-face impacts as opposed to more catastrophic edge-on impacts even if the orientation of the electronic device 10 at the time of the impact suggests an edge-on type of impact. Thus, the increased ability of the lens 15 to absorb and withstand drop impacts will be further increased.

In accordance with further aspects of the invention, an electronic device is provided and includes a substrate assembly comprising a first area and a frame at a periphery of the first area and a lens, which is configured to be affixed to the first area, and which comprises a second area and a curved area at a periphery of the second area. The curved area is separated from the frame by a gap and is configured to reflect light across the gap to hide the gap from an observer looking into the gap.

In accordance with further aspects of the invention, an electronic device is provided and includes a substrate assembly comprising a first area and a frame at a periphery of the first area and a lens, which is configured to be affixed to the first area, the lens comprising a second area and a curved area at a periphery of the second area. The curved area is separate from the frame by a gap and a curvature of the curved area is configured to lead tangentially to a corresponding curvature of the frame across the gap.

In accordance with further aspects of the invention, a method of assembling an electronic device is provided and includes forming a frame outside of a periphery of a first area of a substrate assembly, manufacturing a lens with a second area and a curved area at a periphery of the second area and affixing the lens to the first area such that the curved area is separate from the frame by a gap and a curvature of the curved area leads tangentially to a corresponding curvature of the frame across the gap.

In accordance with embodiments (a), an electronic device is provided and includes a substrate assembly including a first area and a frame at a periphery of the first area, a lens, which is configured to be affixed to the first area, and which comprises a second area and a curved area at a periphery of the second area. The curved area is separated from the frame by a gap and configured to reflect light across the gap to hide the gap from an observer looking into the gap. In accordance with further embodiments (b), the electronic device comprises a handheld, portable electronic device. In accordance with any one or more of embodiments (a or b), the substrate assembly may include a capacitive sensor disposed underneath the lens. In accordance with any one or more of embodiments (a, b or c), the electronic device may include an adhesive by which the lens is adhered to the first area. In accordance with any one or more of embodiments (a, b, c or d), the frame may include a plastic material. In accordance with any one or more of embodiments (a, b, c, d or e), the frame and the lens may both be the same color and glossiness. In accordance with any one or more of embodiments (a, b, c, d, e or f), the second area may be configured to protrude beyond a distal edge of the frame from a plane of the first area. In accordance with any one or more of embodiments (a, b, c, d, e, f or g), a curvature of the curved area may be configured to lead tangentially toward a curvature of the frame. In accordance with any one or more of embodiments (a, b, c, d, e, f, g or h), the curvature may include a continuous curve from the curved area into the gap.

In accordance with embodiments (a), an electronic device is provided and includes a substrate assembly including a first area and a frame at a periphery of the first area and a lens, which is configured to be affixed to the first area, the lens including a second area and a curved area at a periphery of the second area. The curved area is separate from the frame by a gap and a curvature of the curved area is configured to lead tangentially to a corresponding curvature of the frame across the gap. In accordance with further embodiments (b), the electronic device includes a handheld, portable electronic device. In accordance with any one or more of embodiments (a or b), the substrate assembly may include a capacitive sensor disposed underneath the lens. In accordance with any one or more of embodiments (a, b or c), the electronic device may include an adhesive by which the lens is adhered to the first area. In accordance with any one or more of embodiments (a, b or c), the frame may include a plastic material. In accordance with any one or more of embodiments (a, b, c or d), the frame and the lens are both the same color and glossiness. In accordance with any one or more of embodiments (a, b, c, d or e), the second area may be configured to protrude beyond a distal edge of the frame from a plane of the first area. In accordance with any one or more of embodiments (a, b, c, d, e or f), the curvature may include a continuous curve from the curved area into the gap.

In accordance with embodiments (a), a method of assembling an electronic device is provided and includes forming a frame outside of a periphery of a first area of a substrate assembly, manufacturing a lens with a second area and a curved area at a periphery of the second area and affixing the lens to the first area such that the curved area is separate from the frame by a gap and a curvature of the curved area leads tangentially to a corresponding curvature of the frame across the gap. In accordance with further embodiments (b), the manufacturing of the lens may include molding a lens material, grinding the curved area and hardening the lens material. In accordance with any one or more of embodiments (a or b), the method may include providing the frame and the lens with similar color and glossiness.

In accordance with embodiments (a), an electronic device is provided and includes a lens, which is curved proximate to a periphery of the electronic device, and a frame disposed around the periphery to define a gap between the lens and the frame. A curvature of the lens is configured such that an edge-on drop impact with respect to the lens will be effectively realized as a flat-face impact. In accordance with further embodiments (b), the lens protrudes beyond a plane of the frame.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Techniques, systems, subsystems and methods described and illustrated in the various embodiments as discrete or separate may be combined or integrated with other systems, modules, techniques or methods without departing from the scope of the present disclosure. Other items shown or discussed as coupled or directly coupled or communicating with each other may be indirectly coupled or communicating through some interface, device, or intermediate component, whether electrically, mechanically or otherwise. Other examples of changes, substitutions, and alterations are ascertainable by one skilled in the art and could be made without departing from the spirit and scope disclosed herein.

What is claimed is:

1. An electronic device, comprising:
    a substrate assembly comprising a first area and a frame at a periphery of the first area;
    a lens, which is configured to be affixed to the first area, and which comprises a second area and a curved area at a periphery of the second area, wherein the frame and the lens are both the same color and glossiness; and
    the curved area being separated from the frame by a gap and configured to reflect light across the gap to hide the gap from an observer looking into the gap.

2. The electronic device according to claim 1, wherein the electronic device comprises a handheld, portable electronic device.

3. The electronic device according to claim 1, wherein the substrate assembly comprises a capacitive sensor disposed underneath the lens.

4. The electronic device according to claim 1, further comprising an adhesive by which the lens is adhered to the first area.

5. The electronic device according to claim 1, wherein the frame comprises a plastic material.

6. The electronic device according to claim 1, wherein the second area is configured to protrude beyond a distal edge of the frame from a plane of the first area.

7. The electronic device according to claim 1, wherein a curvature of the curved area is configured to lead tangentially toward a curvature of the frame.

8. The electronic device according to claim 1, wherein the curvature comprises a continuous curve from the curved area into the gap.

9. An electronic device, comprising:
   a substrate assembly comprising a first area and a frame at a periphery of the first area;
   a lens, which is configured to be affixed to the first area, the lens comprising a second area and a curved area at a periphery of the second area; and
   the curved area being separated from the frame by a gap and a curvature of the curved area being configured to lead tangentially to a corresponding curvature of the frame across the gap.

10. The electronic device according to claim 9, wherein the electronic device comprises a handheld, portable electronic device.

11. The electronic device according to claim 9, wherein the substrate assembly comprises a capacitive sensor disposed underneath the lens.

12. The electronic device according to claim 9, further comprising an adhesive by which the lens is adhered to the first area.

13. The electronic device according to claim 9, wherein the frame comprises a plastic material.

14. The electronic device according to claim 9, wherein the frame and the lens are both the same color and glossiness.

15. The electronic device according to claim 9, wherein the second area is configured to protrude beyond a distal edge of the frame from a plane of the first area.

16. The electronic device according to claim 9, wherein the curvature comprises a continuous curve from the curved area into the gap.

17. A method of assembling an electronic device, the method comprising:
   forming a frame outside of a periphery of a first area of a substrate assembly;
   manufacturing a lens with a second area and a curved area at a periphery of the second area; and
   affixing the lens to the first area such that the curved area is separate from the frame by a gap and a curvature of the curved area leads tangentially to a corresponding curvature of the frame across the gap.

18. The method according to claim 17, wherein the manufacturing of the lens comprises molding a lens material, grinding the curved area and hardening the lens material.

19. The method according to claim 17, further comprising providing the frame and the lens with similar color and glossiness.

20. An electronic device, comprising:
   a lens, which is curved proximate to a periphery of the electronic device; and
   a frame disposed around the periphery to define a gap between the lens and the frame;
   a curvature of the lens being configured such that an edge-on drop impact with respect to the lens will be effectively realized as a flat-face impact, wherein the curvature of the lens is configured to lead tangentially toward a curvature of the frame.

21. The electronic device according to claim 20, wherein the lens protrudes beyond a plane of the frame.

22. The electronic device according to claim 20, wherein the frame and the lens are both the same color and glossiness.

* * * * *